United States Patent [19]
Sullivan

[11] Patent Number: 5,033,366
[45] Date of Patent: Jul. 23, 1991

[54] MODULAR FOOD PREPARATION STATION

[76] Inventor: Robert E. Sullivan, 8817 Bay Point Dr. C-207, Tampa, Fla. 33615

[21] Appl. No.: 489,202

[22] Filed: Mar. 5, 1990

[51] Int. Cl.$^5$ .......................... A23L 1/01; A23L 3/36; A47J 27/00
[52] U.S. Cl. ...................... 99/352; 99/357; 99/386; 99/443 C
[58] Field of Search ............. 99/386, 357, 451, 443 C, 99/355, DIG. 14, 389, 385, 391, 373, 447, 339

[56] References Cited

U.S. PATENT DOCUMENTS

| | | | |
|---|---|---|---|
| 2,940,458 | 6/1960 | Speckman | 99/443 C |
| 3,448,678 | 6/1969 | Burstein | 99/386 |
| 3,823,660 | 7/1974 | Nerthling | 99/386 |
| 4,252,055 | 2/1981 | Johansson et al. | 99/443 C |
| 4,362,093 | 12/1982 | Griscom | 99/339 |
| 4,377,109 | 3/1983 | Braun et al. | 99/386 |
| 4,473,004 | 9/1984 | Wells et al. | 99/443 C |
| 4,791,861 | 12/1988 | Weinkle et al. | 99/357 |
| 4,840,118 | 6/1989 | Rinehart | 99/447 |
| 4,913,039 | 4/1990 | Sutphen | 99/339 |
| 4,951,648 | 8/1990 | Shukla et al. | 99/386 |
| 4,964,392 | 10/1990 | Bruno et al. | 99/386 |

FOREIGN PATENT DOCUMENTS

| | | | |
|---|---|---|---|
| 3208984 | 12/1982 | Fed. Rep. of Germany | 99/357 |
| 1278337 | 1/1961 | France | 99/339 |

Primary Examiner—William A. Cuchlinski, Jr.
Assistant Examiner—John L. Beres
Attorney, Agent, or Firm—Arthur W. Fisher, III

[57] ABSTRACT

A modular food preparation station for storing and cooking food stuffs such as pizza comprising a base including at least one temperature controlled compartment formed therein to maintain the food stuffs within a predetermined temperature range prior to perparation and an infrared continuous conveyor oven including a thermally insulated cooking chamber having an entrance opening to receive raw food stuffs therethrough and a discharge opening to discharge cooked food therefrom formed at opposite ends thereof, and a continuous conveyor operatively disposed within the thermally insulated cooking chamber to move the food stuffs through the thermally insulated cooking chamber, infrared emitters longitudinally disposed above and below the continuous conveyor and passive emitters formed on opposite sides of the thermally insulated cooking chamber to complement the energy from the infrared emitters to uniformly cook the foodstuffs as the food stuffs pass through the thermally insulated cooking chamber.

27 Claims, 3 Drawing Sheets

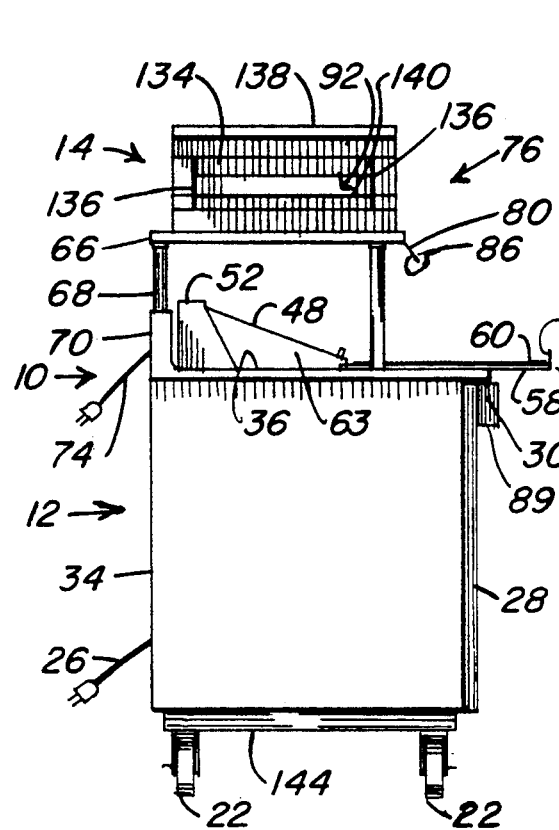
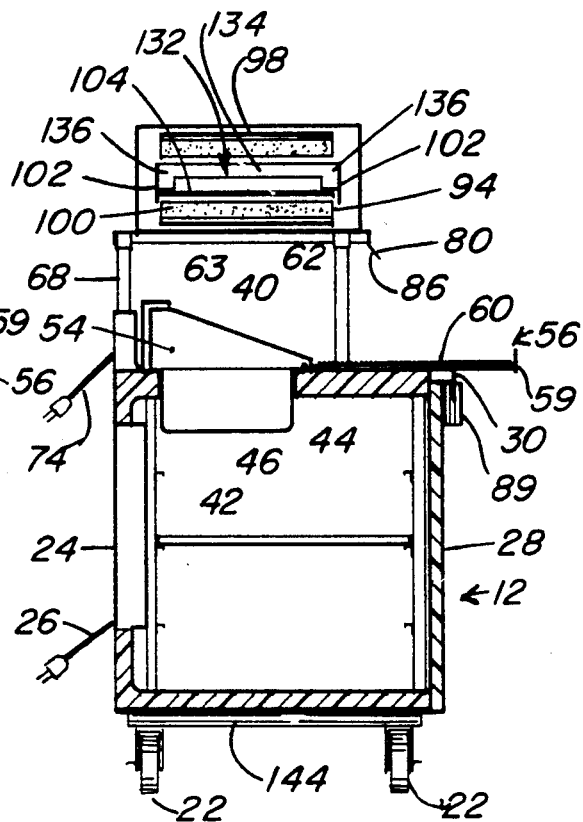
FIG. 4
FIG. 5
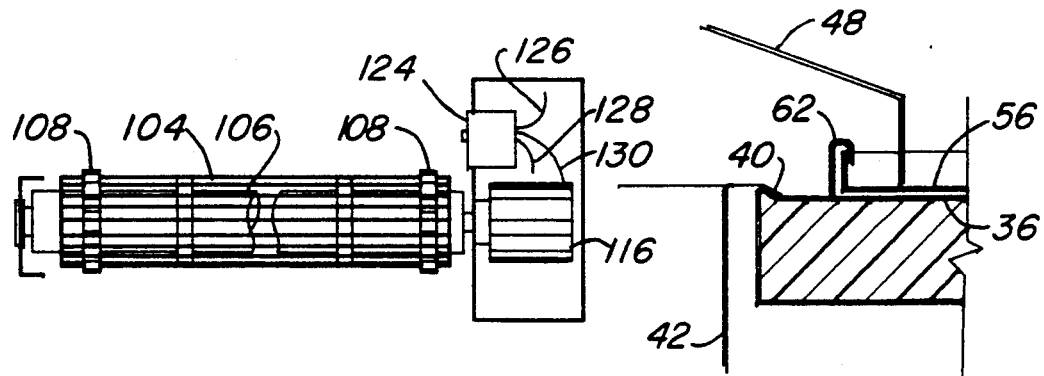
FIG. 6
FIG. 7

MODULAR FOOD PREPARATION STATION

BACKGROUND OF THE INVENTION

1. Field of the Invention

A modular food preparation station for storing and cooking food stuffs such as pizza comprising a base including at least one temperature control compartment formed therein to maintain the food stuffs within a predetermined temperature range prior to preparation and an infrared continuous conveyor oven to cook the food stuffs.

2. Description of the Prior Art

Pizzas include a pastry shell with topping ingredients such as tomato paste, cheese, seasonings and other vegetable, meat or similar ingredients. The shell of the pizza must be baked relatively slowly and the shell dough should be cooked through with a flaky tender crust that is browned but not burned, and the topping ingredients not burned.

Pizza ovens typically comprise a tunnel chamber within a thermally insulated casing having openings at opposite ends thereof through which an endless carrier or conveyor extends so that the pizza can continuously enter and leave the tunnel chamber.

U.S. Pat. No. 4,377,109 shows a product conveyor that has a predominately open area to transport food such as pizzas to be cooked through a thermally insulated treatment zone. An array of nozzles disposed below the conveyor discharges streams of heated air upwardly through the conveyor against the bottom surfaces of the food products on the conveyor for primary heat exchange treatment. A reflection surface forms an upper boundary of the treatment zone and the portion of the upwardly flowing air streams that is not deflected by the food products on the conveyor impinges against the deflection surface and is transformed into downward flowing relatively low velocity air for flow against and across the top surfaces of the food products.

U.S. Pat. No. 4,252,055 discloses a baking oven comprising a thermally insulated casing defining a tunnel-chamber through which an endless conveyor belt extends. Reversing elements at the end of the conveyor belt are supported by brackets that can tilt upwardly to shorten the effective length of the oven for shipment and, with the upper portion of the casing removed, to enable slackening of the conveyor belt thereby facilitating manual raising of the central portion thereof for cleaning structure lying therebelow. The top of the casing serves as a countertop for preparing food and the tunnel-chamber and conveyor belt lie therebelow thus conserving floor space.

U.S. Pat. No. 3,448,678 teaches a radiant-heat cooker employing a housing with a tunnel enclosure portion through which an open-work conveyor passes and in which radiant heaters are mounted above and below the conveyor. The heaters supply ultraviolet and infrared radiation for complete cooking during a single passage. The conveyor is formed of linked bars with one bar having a removable open link.

U.S. Pat. No. 4,462,307 shows an oven-broiler including a tunnel-form cooking chamber and a conveyor extending therethrough for conveying food products through the chamber for cooking of the products by emission of infrared radiation from the walls of the tunnel. An entrance and an exit are located at opposite ends of the chamber for continuous ingress and egress of the food products at a level lower than the chamber floor for causing the chamber to entrap a heated, oxygen-starved atmosphere in which flaming of the food products cannot freely occur.

SUMMARY OF THE INVENTION

The present invention relates to a modular food preparation station for storing and cooking food stuffs such as pizza comprising a base and an infrared continuous conveyor oven.

The base comprises a temperature controlled compartment having an open storage section affixed to one end thereof and a countertop formed on the top thereof.

The countertop comprises a substantially horizontal countertop memmber having an aperture formed therein. A support lip is formed about the periphery of the aperture to support a removable ingredient tray including a plurality of open compartments to receive various food stuffs such as tomato paste, cheese, seasonings and other vegetables, meat or similar ingredients. When the removable ingredient tray or pan is operationally placed within the aperture, the lower surface thereof is directly exposed to the interior of the temperature controlled compartment to maintain the food stuffs placed within the open compartments at a predetermined temperature. A tray cover is pivotally coupled to a pair of cover brackets extending upwardly for the substantially horizontal countertop member to permit selective access to the removable ingredient tray.

A removable preparation tray is coupled to the substantially horizontal countertop member. An oven support frame including a substantially horizontal oven support is held in spaced relation relative to the substantialy horizontal countertop.

The infrared continuous conveyor oven comprises an enclosure including a thermally insulated cooking chamber having a entrance opening and discharge opening formed on opposite ends thereof. A passive and second infrared emitter is disposed on each side of the thermally insulated cooking chamber to complement the energy of the first and second infrared emitters.

A conveyor is provided to move the food stuffs through the thermally insulated cooking chamber. A curtain means comprising a substantially horizontal tunnel curtain having a vertical extension extending downwardly from opposite sides thereof is operably disposed adjacent the entrance opening and the discharge opening which in combination with a hood disposed on opposite ends of the enclosure above the entrance opening and discharge opening reduce the effect of external drafts within the thermally insulated cooking chamber to a minimum.

In use the ingredients or condiments are removed from the temperature controlled compartment and placed in the open compartments. Dough for the individual pizzas supported by a metal cooking screen is placed on the removable preparation tray to permit application of the various condiments or ingredient thereon. Once prepared, the desired temperature and cook time are selected.

The pizza and metal cooking tray are placed on the conveyor means. The pizza enters the entrance opening and travels through the thermally insulated cooking chamber where the pizza receives energy from the first and second infrared emitters and reflected energy from the passive emmitters to cook not only the top and bottom of the pizza but the sides uniformly. The pizza then exits the thermally insulated cooking chamber through the discharge opening and comes to rest on a substantialy horizontal exit tray. The pizza may then be removed therefrom.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 4 is an end view of the modular food preparation station.

FIG. 5 is a cross-sectional end view of the modular food preparation station.

FIG. 6 is a partial view of the drive motor and conveyor.

FIG. 7 is a partial side view of the countertop and removable preparation tray.

Similar reference characters refer to similar parts throughout the several views of the drawings.

DETAILED DESCRIPTION OF THE PREFERRED EMBODIMENT

Figure 1:
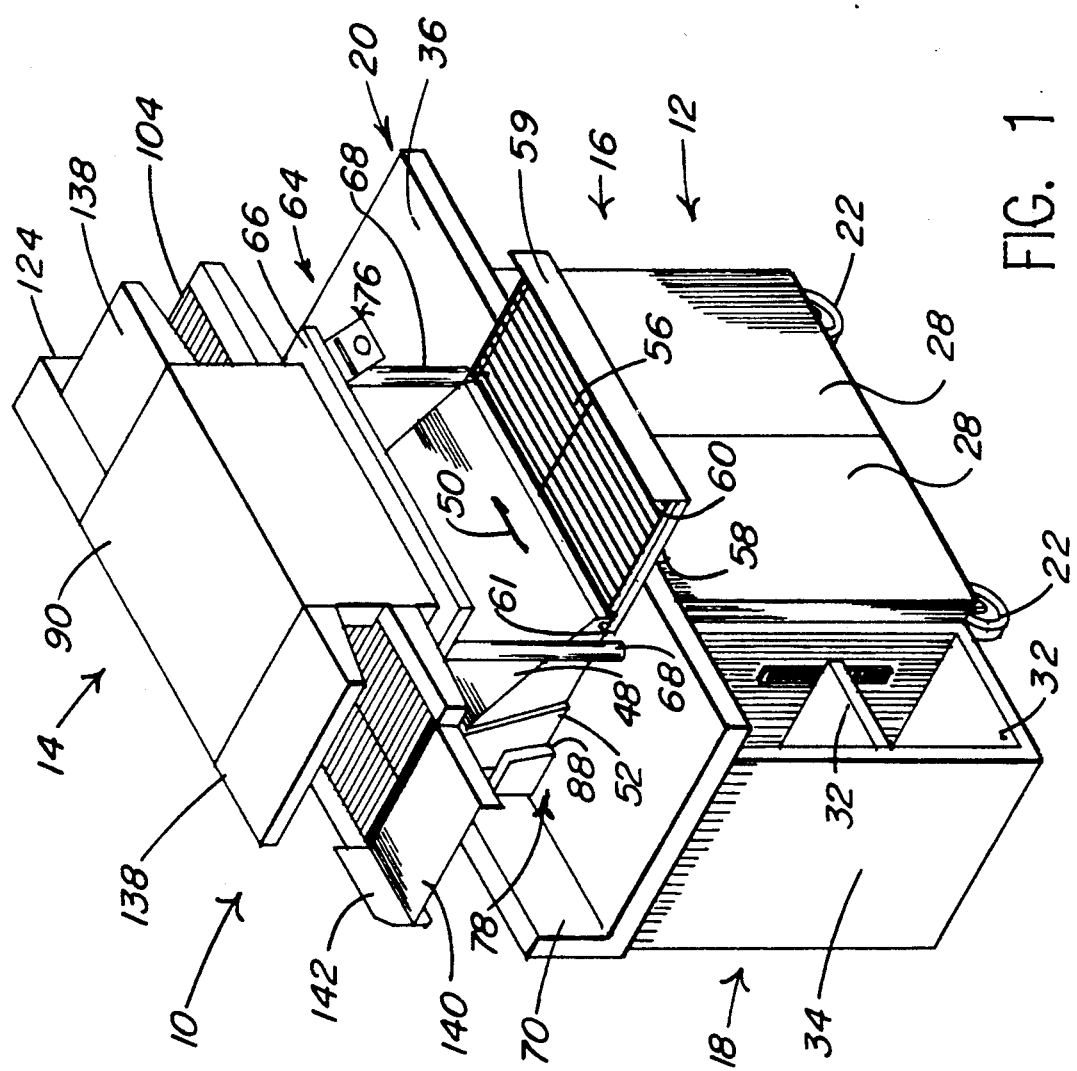
FIG. 1 is a perspective view of the modular food preparation station.
Figure 2:
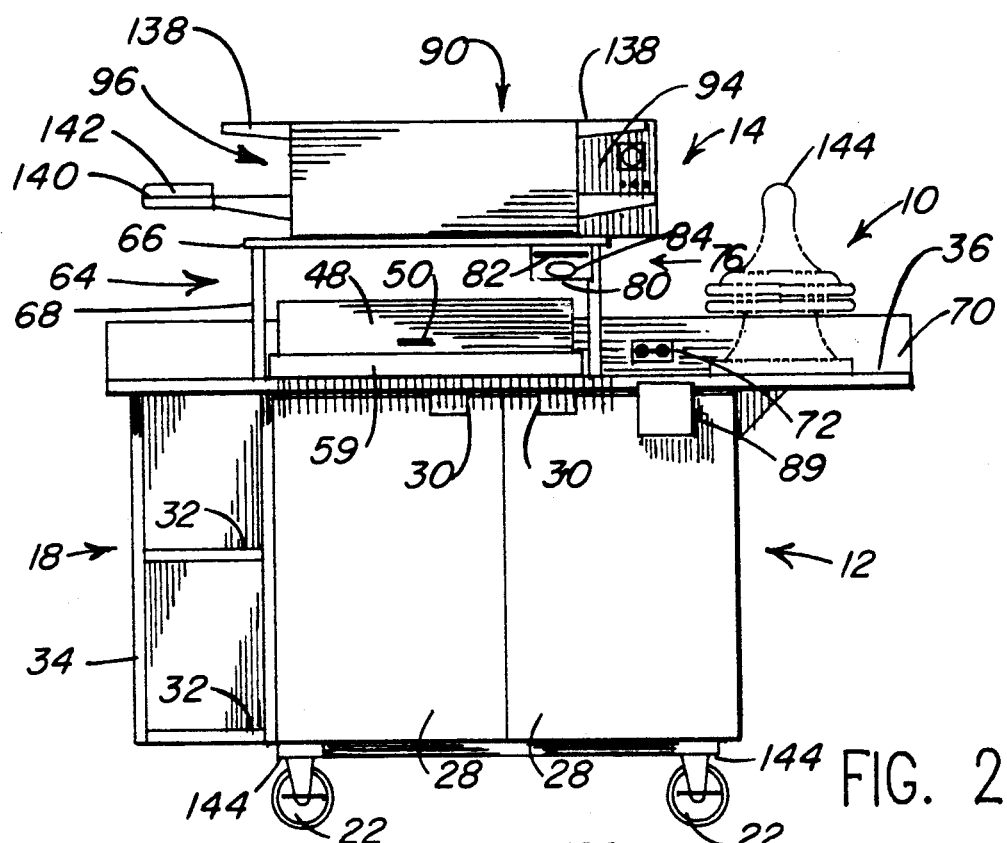
FIG. 2 is a front view of the modular food preparation station.
Figure 3:
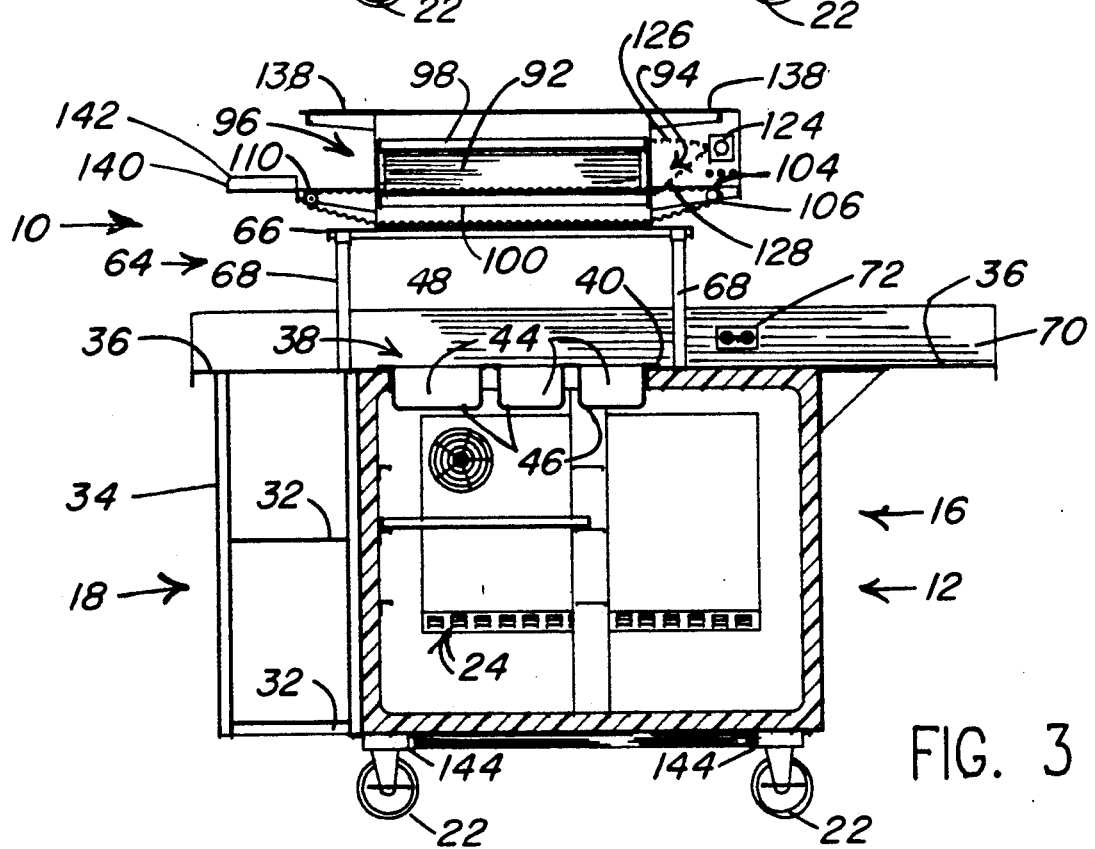
FIG. 3 is a cross-sectional front view of the modular food preparation station.

As best shown in FIGS. 1 through 3, the invention relates to a modular food preparation station generally indicated as 10 for storing and cooking food stuffs such as pizza comprising a base generally indicated as 12 and an infrared continuous conveyor oven generally indicated as 14.

As shown in FIGS. 1 through 3, the base 12 comprises a temperature controlled compartment generally indicated as 16 having an open storage section generally indicated as 18 affixed to one end thereof and a countertop generally indicated as 20 formed on the top thereof. The base 12 is supported on the floor by a plurality of swivel casters each indicated as 22.

The temperature controlled compartment 16 includes a cooling unit 24 electrically connected to an external power source (not shown) by an electrical plug/conductor combination 26. A pair of doors each indicated as 28 to permit access to the interior of the thermally controlled compartment 16 by the movement or actuation of a corresponding handle 30. The open storage section 18 comprises a plurality of substantially horizontal shelves each indicated as 32 held in spaced relationship relative to each other by a substantially vertical panel 34 affixed to the countertop 20.

The countertop 20 comprises a substantially horizontal countertop member 36 having an aperture 38 formed therein. A support lip 40 is formed about the periphery of the aperture 38 to support a removable ingredient tray 42 including a plurality of open compartments each indicated as 44 to receive various food stuffs such as tomato paste, cheese, seasonings and other vegetable, meat or similar ingredients. Alternately, a plurality of smaller removable trays or pans each including at least one compartment may be placed within the aperture 38.

When the removable ingredient tray or pan 42 is operationally placed within the aperture 38, the lower surface 46 thereof is directly exposed to the interior of the temperature controlled compartment 16 to maintain the food stuffs placed within the open compartments 44 at a predetermined temperature. A tray cover 48 including a cover handle 50 is pivotally coupled to a pair of cover brackets each indicated as 52 extending upwardly from the substantially horizontal countertop member 36 by a corresponding mounting pin 54 to permit selective access to the removable ingredient tray 42 and the food stuffs stored therein.

A removable preparation tray 56 including a substantially vertical peripheral lip 58 having a raised front wall 59 and a plurality of substantially horizontal elongated support elements each indicated as 60 is removably coupled to the substantially horizontal countertop member 36 by a pair of substantially J-shaped coupling elements each indicated as 62 disposed adjacent the aperture 38. A slot 61 is formed in each cover side wall 63 to receive the substantially vertical peripheral lip 58 therethrough.

An oven support frame generally indicated as 64 including a substantially horizontal oven support 66 is held in spaced relation relative to the substantially horizontal countertop member 36 by a plurality of substantially vertical oven support frame members each indicated as 68.

The countertop 20 further includes a substantially vertical member 70 extending upwardly from the rear portion of the substantially horizontal countertop member 36. At least one electric socket 72 electrically connected to an external power source (not shown) by an electric plug/conductor combination 74 is mounted on the substantially vertical member 70.

The base 12 further includes a first and second utensil support generally indicated as 76 and 78 respectively. The first utensil support comprises a plate 80 affixed to the substantially potentially horizontal oven support 66 having a slot 82 and circular aperture 84 formed therethrough. An L-shaped bracket 86 extends downwards from the inner surface of the plate 80. When not in use a dough knife (not shown) may be extended through the slot 82 and a dough perforator (not shown) may be extended through the circular aperture 84 and engage the L-shaped bracket 86. The second utensil support 78 comprises of least one channel 88 to receive and store a metal cooking screen (not shown) used in cooking the pizza. A third utensil support 89 to selectively store a pizza cutter (not shown) is mounted on one of the doors 28.

The infrared continuous conveyor oven 14 comprises an enclosure 90 including a thermally insulated cooking chamber 92 having a entrance opening 94 and discharge opening 96 formed on opposite ends thereof. A first and second infrared emitter indicated as 98 and 100 respectively are disposed in energy transfer relationship above and below the thermally insulated cooking chamber 92. A passive emitter 102 manufactured of steel is disposed on each side of the thermally insulated cooking chamber 92 thereby absorbing thermal energy from the first and second infrared emitters 98 and 100 and radiating infrared energy to complement the infrared energy of the first and second infrared emitters 98 and 100.

A conveyor means is provided to move the food stuffs through the thermally insulated cooking chamber 92. Specifically, the conveyor means comprises a conveyor generally indicated as 104 disposed between a drive shaft 106 having a plurality of teeth or gears each indicated as 108 affixed thereto and an idler shaft 110 disposed at the opposite end of the convey 104. The drive shaft 106 is coupled to a drive motor 116. The first and second infrared emitters 98 and 110, and drive motor 116 are coupled to a control panel 124 through electrical conductors 126, 128 and 130 respectively.

As best shown FIG. 5, a curtain means generally indicated as 132 comprising a substantially horizontal tunnel curtain 134 having a vertical extension 136 extending downwardly from opposite sides thereof is operably disposed adjacent the entrance opening 94 and the discharge opening 96 which in combination with a hood 138 disposed on opposite ends of the enclosure 90 above the entrance opening 94 and discharge opening 96 reduce the effect of external drafts within the thermally insulated cooking chamber 92 to a minimum.

Adjacent the discharge opening 96 is a substantially horizontal exit tray 140 including a substantially vertical backstop 142 to receive cooked foodstuffs from the thermally insulated cooking chamber 92 and permit ease of removal from the substantially horizontal exit tray 140 with a spatula or the like.

In use the ingredients or condiments are removed from the temperature controlled compartment 16 and placed in the open compartments 44. A dough press 144 is provided to prepare the dough before placing on the metal cooking screen (not shown). Dough for the individual pizzas supported by a metal cooking screen (not shown) is then placed on the substantially horizontal elongated support elements 60 to permit application of the various condiments or ingredients thereon. Once prepared, the desired temperature and cook time are selected on the control panel 124. Typically the temperature of the first infrared emitter is set at 725 degrees Fahrenheit, while the temperature of the second infrared emitter is set at 700 degrees Fahrenheit. The cook time determined by the selected speed of the drive motor 116 is typically 6 minutes.

When placed on the conveyor 104, the pizza enters the entrance opening 94 and travels through the thermally insulated cooking chamber 92 where the pizza receives energy from the first and second infrared emitters 98 and 100 and the secondary energy generated by the passive emmitters 102 in response to thermal energy from the first and second infrared energy emitters 98 and 100 to cook not only the top and bottom of the pizza but the sides uniformly. The pizza then exits the thermally insulated cooking chamber 92 through the discharge opening 96 and comes to rest on the substantially horizontal exit tray 140.

The pizza may then be removed from the substantially horizontal exit tray 140 with a spatula forcing the pizza against the substantially vertical backstop 142. The cantilevered preparation tray 56 may easily be removed from the substantially J-shaped coupling elements 62 where the tray cover 48 is open. Similarly the removable ingredient tray 42 may be removed from the aperture 38 for cleaning and storage.

As best shown in FIGS. 2 through 5, the swivel casters 22 are coupled to the lower portion of the base 12 by a lateral or transverse channel 144 extending across opposite sides of the base 12.

It will thus be seen that the objects set forth above, among those It will thus be seen that the objects set forth above, amont those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A modular food preparation station for storing and cooking food stuffs such as pizza comprising a base including at least one temperature controlled compartment formed therein to maintain the food stuffs within a predetermined temperature range prior to preparation, said base includes a substantially horizontal countertop member having an aperture formed therein, a support lip formed about the periphery of said aperture to support a removable ingredient tray including a plurality of open compartments to receive various food stuffs such that the lower surface is directly exposed to the interior of the temperature controlled compartment to maintain the food stuffs placed within said open compartments at a predetermined temperature, an infrared continuous conveyor oven including a thermally insulated cooking chamber having an entrance opening to receive raw food stuffs therethrough and a discharge opening to discharge cooked food therefrom formed at opposite ends thereof, and a continuous conveyor operatively disposed within said thermally insulated cooking chamber to move the food stuffs through said thermally insulated cooking chamber, infrared emitters longitudinally disposed above and below said continuous conveyor and passive emitters formed on opposite sides of said thermally insulated cooking chamber to complement the energy from said infrared emitters to uniformly cook the food stuffs as the food stuffs pass through said thermally insulated cooking chamber.

2. The modular food preparation station of claim 1 further including a curtain means comprising a substantially horizontal tunnel curtain having a vertical extension extending downardly from opposite sides thereof operable disposed adjacent said entrance opening and said discharge opening to reduce the effect of external drafts within said thermally insulated cooking chamber to a minimum.

3. The modular food preparation station of claim 2 further including a hood disposed above said entrance opening and said discharge opening to further reduce the effect of external drafts within said thermally insulated cooking chamber.

4. The modular food preparation station of claim 1 further including an exit tray including a substantially vertical backstop disposed adjacent said discharge opening to receive cooked foodstuffs from said thermally insulated cooking chamber.

5. The modular food preparation station of claim 1 further including a tray cover is pivotally coupled to a pair of cover brackets extending upwardly from said substantially horizontal countertop member to permit selective access to said removable ingredient tray and the food stuffs stored therein.

6. The modular food preparation station of claim 5 further including a removable preparation tray including a substantially vertical peripheral lip removably coupled to said substantially horizontal countertop member.

7. The modular food preparation station of claim 6 wherein said removable preparation tray includes a raised front wall.

8. The modular food preparation station of claim 7 wherein said removable preparation tray further includes a plurality of substantially horizontal elongated support elements.

9. The modular food preparation station of claim 6 wherein said substantially horizontal countertop includes a pair of coupling elements to selectively engage said substantially vertical peripheral lip.

10. The modular food preparation station of claim 10 wherein said tray cover includes a pair of slots to receive said substantially vertical peripheral lip.

11. The modular food preparation station of claim 1 further includes an oven support frame including a substantially horizontal oven support held in spaced relation relative to said base a plurality of substantially vertical oven support frame members.

12. The modular food preparation station of claim 1 wherein said base further includes a first and second utensil support.

13. The modular food preparation station of claim 12 wherein said first utensil support comprises a plate affixed to said base having a slot and circular aperture formed therethrough.

14. The modular food preparation station of claim 12 wherein said second utensil support comprises of least one channel to receive and store a cooking screen.

15. A modular food preparation station for storing and cooking food stuffs such as pizza comprising a base including at least one temperature controlled compartment formed therein to maintain the food stuffs within a predetermined temperature range prior to preparation, said base further includes a first utensil support, said first utensil support comprises a plate affixed to said base having a slot and circular aperture formed therethrough and an infrared continuous conveyor oven including a thermally insulated cooking chamber having an entrance opening to receive raw food stuffs therethrough and a discharge opening to discharge cooked food therefrom formed at opposite ends thereof, and a continuous conveyor operatively dipsoed within said thermally insulated cooking chamber to move the food stuffs through said thermally insulated cooking chamber, infrared emitters longitudinally disposed above and below said continuous conveyor and passive emitter formed on opposite sides of said thermally insulated cooking chamber to complement the energy from said infrared emitters to uniformly cook the food stuffs as the food stuffs pass through said thermally insulated cooking chamber.

16. The modular food preparation station of claim 15 further including a curtain means comprising a substantially horizontal tunnel curtain having a vertical extension extending downwardly from opposite sides thereof operably disposed adjacent said entrance opening and said discharge opening to reduce the effect of external drafts within said thermally insulated cooking chamber to a minium.

17. The modular food preparation station of claim 16 further including a hood disposed above said entrance opening and said discharge opening to further reduce the effect of external drafts within said thermally insulated cooking chamber.

18. The modular food preparation station of claim 15 further including an exit tray including a substantially vertical backstop disposed adjacent said discharge opening to receive cooked foodstuffs from said thermally insulated cooking chamber.

19. The modular food preparation station of claim 15 wherein said base includes a substantially horizontal countertop member having an aperture formed therein, a suppport lip formed about the periphery of said aperture to support a removable ingredient tray including a plurality of open compartments to receive various food stuffs such that the lower surface is directly exposed to the interior of the temperature controlled compartment to maintain the food stuffs placed within said open compartments at a predetermined temperature.

20. The modular food preparation station of claim 19 further including a tray cover is pivotally coupled to a pair of cover brackets extending upwardly from said substantially horizontal countertop member to permit selective access to said removable ingredient tray and the food stuffs stored therein.

21. The modular food preparation station of claim 20 further including a removable preparation tray including a substantially vertical peripheral lip removably coupled to said substantially horizontal countertop member.

22. The modular food preparation station of claim 21 wherein said removable preparation tray includes a raised front wall.

23. The modular food preparation station of claim 22 wherein said removable preparation tray further includes a plurality of substantially horizontal elongated support elements.

24. The modular food preparation station of claim 21 wherein said substantially horizontal countertop includes a pair of coupling elements to selectively engage said substantially vertical peripheral lip.

25. The modular food preparation station of claim 24 wherein said tray cover includes a pair of slots to receive said substantially vertical peripheral lip.

26. The modular food preparation station of claim 15 further includes an oven support frame including a substantially horizontal oven support held in spaced relation relative to said base a plurality of substantially vertical oven support frame members.

27. The modular food preparation station of claim 15 wherein said base further includes a second utensil support comprising of least one channel to receive and store a cooking screen.

* * * * *